(12) United States Patent
Puck

(10) Patent No.: US 7,530,521 B2
(45) Date of Patent: May 12, 2009

(54) HOSE REEL SYSTEM

(75) Inventor: Benny D. Puck, Manning, IA (US)

(73) Assignee: Puck Custom Enterprises, Inc., Manning, IA (US)

(*) Notice: Subject to any disclaimer, the term of this patent is extended or adjusted under 35 U.S.C. 154(b) by 0 days.

(21) Appl. No.: 11/810,844

(22) Filed: Jun. 7, 2007

(65) Prior Publication Data

US 2008/0302903 A1 Dec. 11, 2008

(51) Int. Cl.
*B65H 16/02* (2006.01)

(52) U.S. Cl. .................. 242/403; 242/557; 280/444; 280/499

(58) Field of Classification Search .............. 242/403, 242/533.8, 557, 390.2, 390.5, 614; 280/444, 280/498, 499
See application file for complete search history.

(56) References Cited

U.S. PATENT DOCUMENTS

| | | | | |
|---|---|---|---|---|
| 1,460,839 A | * | 7/1923 | Biggam | 280/474 |
| 2,100,447 A | * | 11/1937 | Mahaffey | 280/443 |
| 2,210,008 A | * | 8/1940 | Rodin | 280/493 |
| 2,867,390 A | * | 1/1959 | Anrig | |
| 3,091,413 A | * | 5/1963 | Leithiser | 242/403 |
| 3,792,876 A | * | 2/1974 | Norman | 280/493 |
| 3,876,240 A | * | 4/1975 | Watson | 280/443 |
| 3,941,324 A | * | 3/1976 | Green | 242/403 |
| 4,174,809 A | * | 11/1979 | Arlemark | 242/390.5 |
| 4,176,807 A | * | 12/1979 | Kwon | 242/613.2 |
| 4,194,702 A | * | 3/1980 | Ploeg | 242/403 |
| 4,454,999 A | * | 6/1984 | Woodruff | 242/403 |
| 4,878,681 A | * | 11/1989 | Busboom et al. | 280/444 |
| 5,139,751 A | * | 8/1992 | Mansfield et al. | 242/390.2 |
| 5,156,355 A | * | 10/1992 | Wadle | 242/557 |
| 5,201,406 A | * | 4/1993 | Kellis | |
| 6,419,424 B1 | * | 7/2002 | Null et al. | 242/557 |
| 6,932,294 B1 | * | 8/2005 | Larson | 242/390.5 |
| 2004/0140391 A1 | * | 7/2004 | Saliba | 242/614 |

* cited by examiner

*Primary Examiner*—William A Rivera
(74) *Attorney, Agent, or Firm*—Brett Trout

(57) ABSTRACT

A hose reel system for winding a liquid manure hose. The hose reel includes a spool pivoted in alignment with the wheels and axles of the system to allow for even winding of the hose on a spool. The spool is provided with curved domes on either end and a protective bar to prevent the hose from winding beyond the ends of the spool. Pivoting the spool in alignment with the axle allows for a more even winding and unwinding of the hose, thereby reducing torsion, kinks and other damage to the hose during the rolling and unrolling processes.

20 Claims, 4 Drawing Sheets

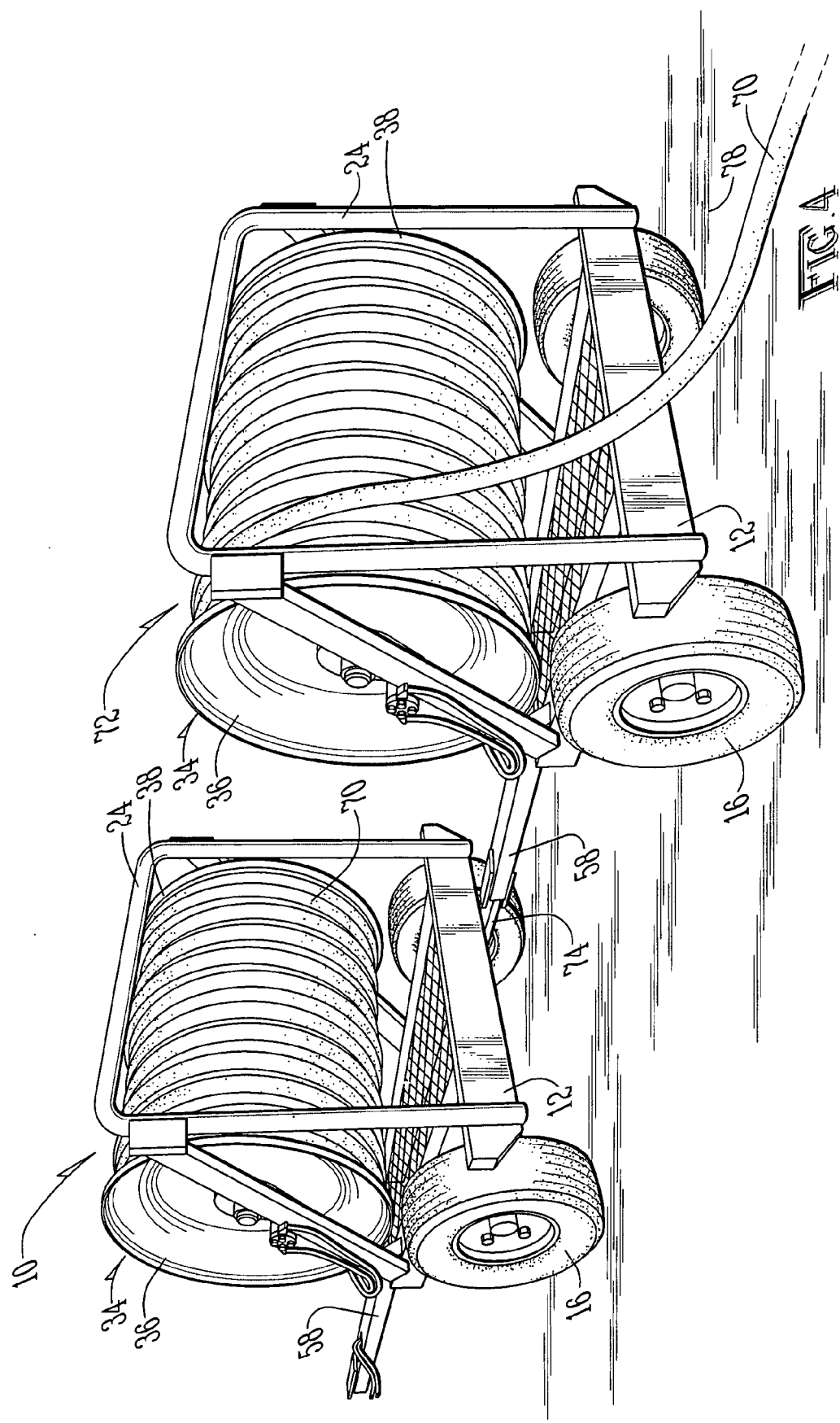

HOSE REEL SYSTEM

BACKGROUND OF THE INVENTION

1. Field of the Invention

The present invention relates in general to a hose reel system and, more particularly to a hose reel system for winding and unwinding a liquid manure hose on an agricultural field.

2. Description of the Prior Art

It is known in the art of agricultural liquid manure application to lay out a hose along the path of the manure application. A liquid manure supply and pump are connected to one end of the hose, and the manure applicator is connected to the other end. The manure applicator travels across the field delivering manure to the field for use as fertilizer. As it is desirable to quickly lay out and remove a hose from a field, it is known in the art to use hose reel systems which are pulled by a tractor or similar vehicle. Prior art hose reels typically include a large mechanically driven spool coupled to a wheeled frame. To lay out the hose, the hose is coupled at one end to a pump or similar stationary object. The vehicle then pulls the hose reel as the hose unwinds from the spool, and lays out along the agricultural field. When it is desirable to remove the hose from the field, the hose is coupled to the hose reel and a motor on the hose reel is used to drive the spool and wind the hose onto the reel.

One drawback associated with the prior art is the tendency for the hose to wind on the spool in a single spot. This causes overlapping and tangling of the hose, which can lead to twists, kinks and other malfunctions associated with the hose. It can also lead to the hose tying up on itself as it winds on the spool. When it is desired to unwind the hose from the spool, the hose may catch against itself and may cause tearing or ripping of the hose.

It is also known in the art to provide a means for pivoting the hose reel as the hose is being wound around the spool. By pivoting the hose reel, the hose winds along the spool more evenly. One drawback associated with prior art pivoting hose reels is that they simply turn back and forth. While the back and forth motion tends to wind the hose somewhat more evenly along the spool, the turning is difficult to control and does not maximize the efficiency of the winding of the hose along the spool.

Another drawback associated with the prior art is the difficulty associated with winding the spool most efficiently at the ends of the spool. As the ends of the spool are typically flat, it is difficult to obtain accurate winding at the end of the spool. It would, therefore, be desirable to provide a hose reel which allows for efficient winding of the spool at the end of the spool.

Still another drawback associated with the prior art is the tendency of the hose to extend beyond the edges of the spool during winding. If this occurs, the hose can become entangled in the drive mechanism, causing damage to both the hose and the drive mechanism itself. It would, therefore, be desirable to provide a mechanism for preventing the hose from winding beyond the edges of the spool.

Given the limitations of the prior art, it would be desirable to provide a hose reel which allows for more efficient pivoting of the hose reel during winding, more efficient winding of the spool near the ends of the spool, and means for preventing the hose from extending beyond the ends of the spool. The difficulties encountered in the prior art discussed hereinabove are substantially eliminated by the present invention.

SUMMARY OF THE INVENTION

In an advantage provided by this invention, a hose reel system is provided which allows for pivoting of the hose reel to more efficiently wind the hose on a spool.

Advantageously, this invention provides a hose reel which is of a lightweight, low cost manufacture.

Advantageously, this invention provides a hose reel which is long lasting and easy to maintain.

Advantageously, this invention provides a hose reel which allows for more efficient winding of the hose at the ends of the spool.

Advantageously, this invention provides a hose reel which prevents the hose from winding beyond the ends of the spool.

Advantageously, in the preferred embodiment of this invention, a hose reel is provided which includes spool journaled to a frame along a first axis. A tongue is provided, pivotally coupled to a frame. A spool is journaled to the frame. An axle is coupled to the frame, and wheels are coupled to the axle. Means are provided for pivoting the tongue relative to the frame. In the preferred embodiment, the spool is provided with domed ends to more efficiently wind a hose near the ends of the spool, and an arch guard is provided to prevent the hose from winding beyond the ends of the spool.

BRIEF DESCRIPTION OF THE DRAWINGS

The present invention will now be described, by way of example, with reference to the accompanying drawings in which:

FIG. 4 illustrates a front perspective view of a pair of hose reels coupled in tandem and winding a hose from an agricultural field.

DETAILED DESCRIPTION OF THE PREFERRED EMBODIMENT

Figure 1:
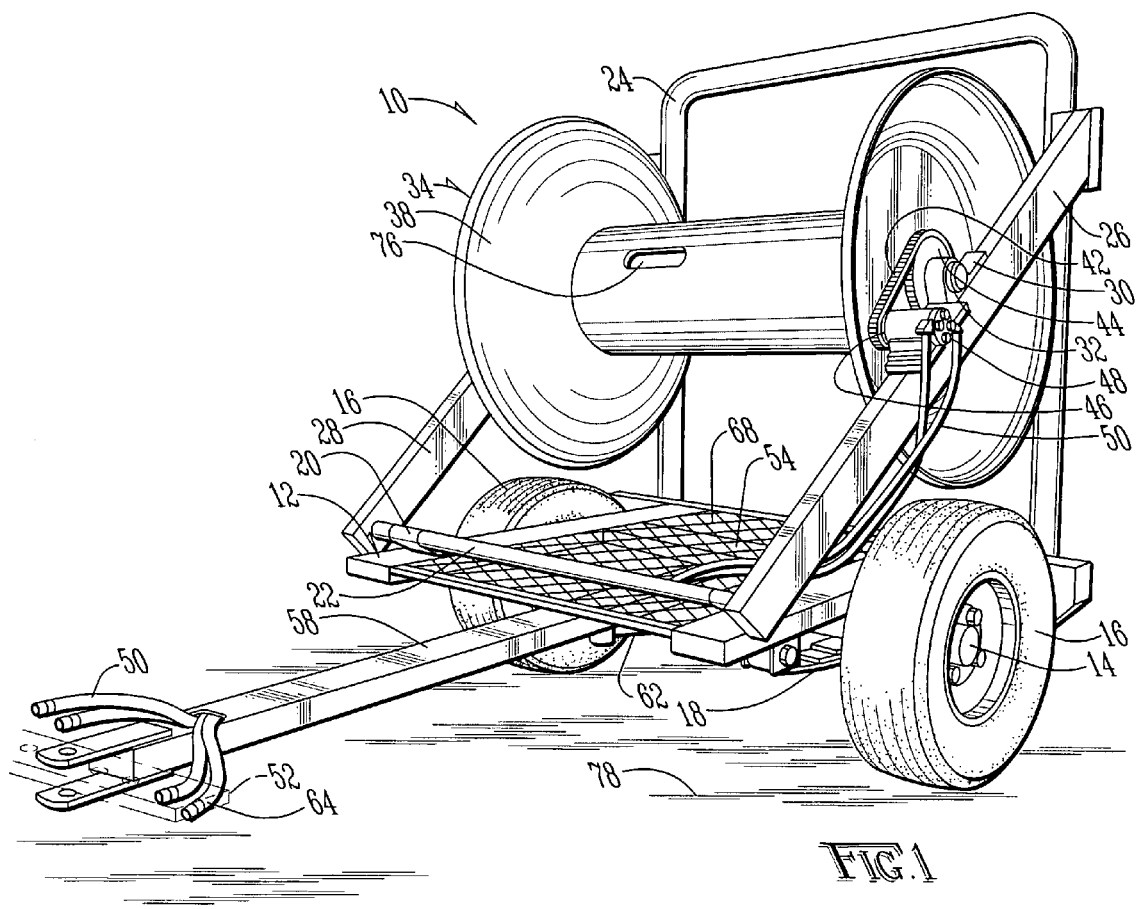
FIG. 1 illustrates a front perspective view of the hose reel system of the present invention.

A hose reel according to the present invention is shown generally as (10) in FIG. 1. The hose reel (10) includes a frame (12). Journaled to the frame (12) is an axle (14) coupled to a pair of wheels (16). The axle (14) is coupled to the frame (12) by leaf springs (18), such as those known in the art.

Provided on the frame are a pair of support bars (20), supporting a shoulder (22). Coupled between the shoulder (22) and an arch guard (24) are a first angled support arm (26) and a second angled support arm (28). Provided on the angled support arms (26) and (28) are support brackets (30). Journaled between the support brackets (30) is an axle (32) around which is journaled a spool (34). The spool (34) includes a first curved dome (36) and a second curved dome (38), coupled to one another by a sleeve (40). Secured to the spool (34) is a large gear (42). The large gear (42) is coupled by a chain (44) to a small gear (46). As shown in FIG. 1, the small gear is driven by a hydraulic motor (48) secured to the support bracket (30) on the first angled support arm (26). The hydraulic motor (48) is coupled by hydraulic lines (50) to the hydraulic system of a pulling vehicle, such as a tractor (52).

Figure 2:
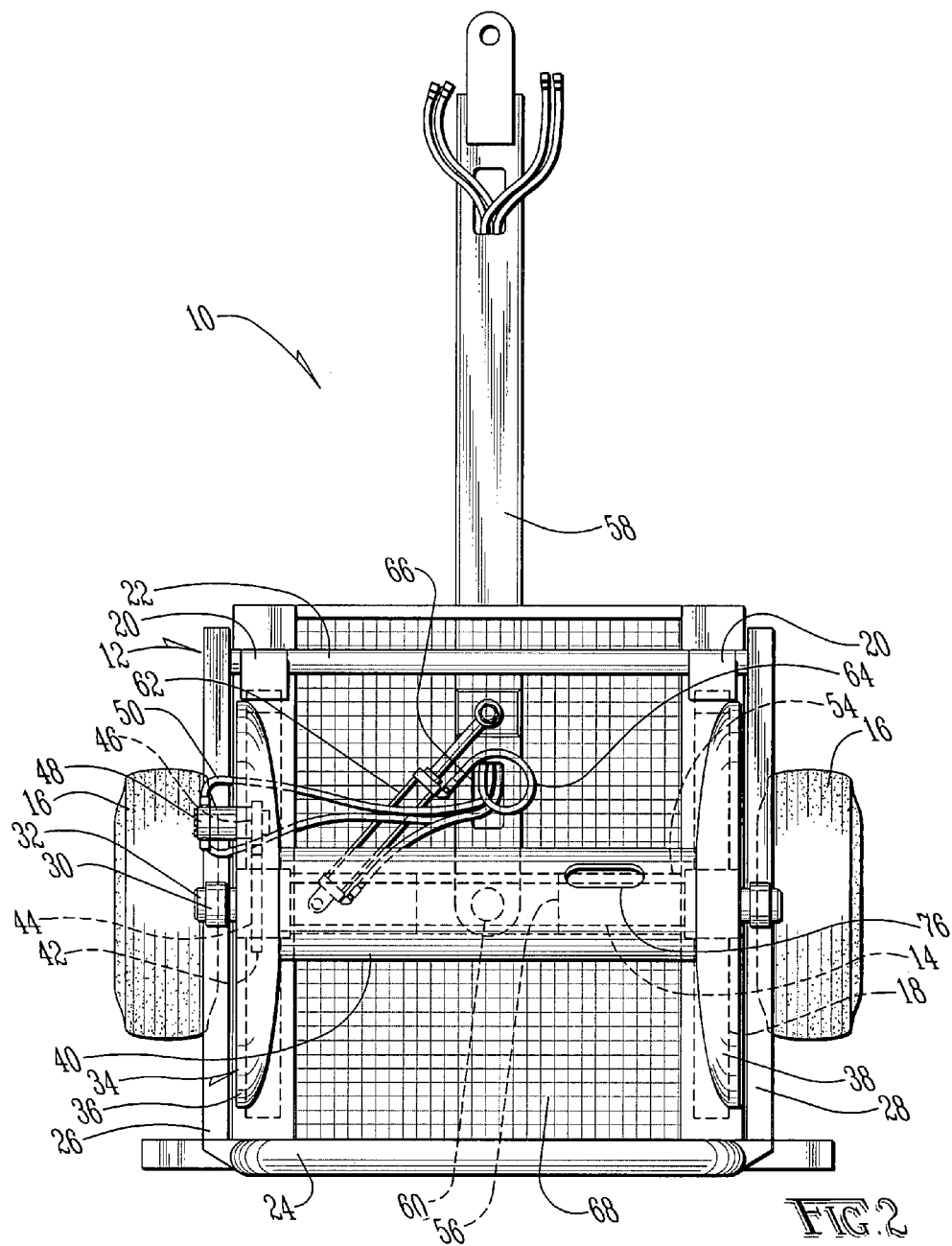
FIG. 2 illustrates a top perspective view of the pivotal connection of the tongue to the cross member of the hose reel.

Coupled to the frame (12) is a cross brace (54) supporting a pivot box (56), constructed of steel or similar rigid material. (FIG. 2). A towing tongue (58) is coupled to the pivot box (56) by a pin (60) to allow the tongue (58) to pivot relative to the frame (12) of the hose reel (10). A linear actuator such as a hydraulic piston (62) is coupled between the cross brace (54) and the pin (60). The hydraulic piston (62) is driven by hydraulic lines (64) which extend from the hydraulic piston (62) through a hole (66) in the towing tongue (58) to the tractor (52). (FIGS. 1-2). A lattice fence (68) is provided across the bottom of the frame (12) to prevent material from moving upward from the field into contact with a hose (70) provided around the spool (34), and to prevent the hose (70) from dropping downward through the frame (12) to be run over by the hose reel (10). The hose reel (10) is preferably constructed of steel, but parts thereof may be constructed of PVC or other similarly strong, weather resistant material. As shown in FIG. 4, a second hose reel (72) may be coupled to the first hose reel (10) by a hitch (74) coupled to the frame (12) of the hose reel (10).

Figure 3:
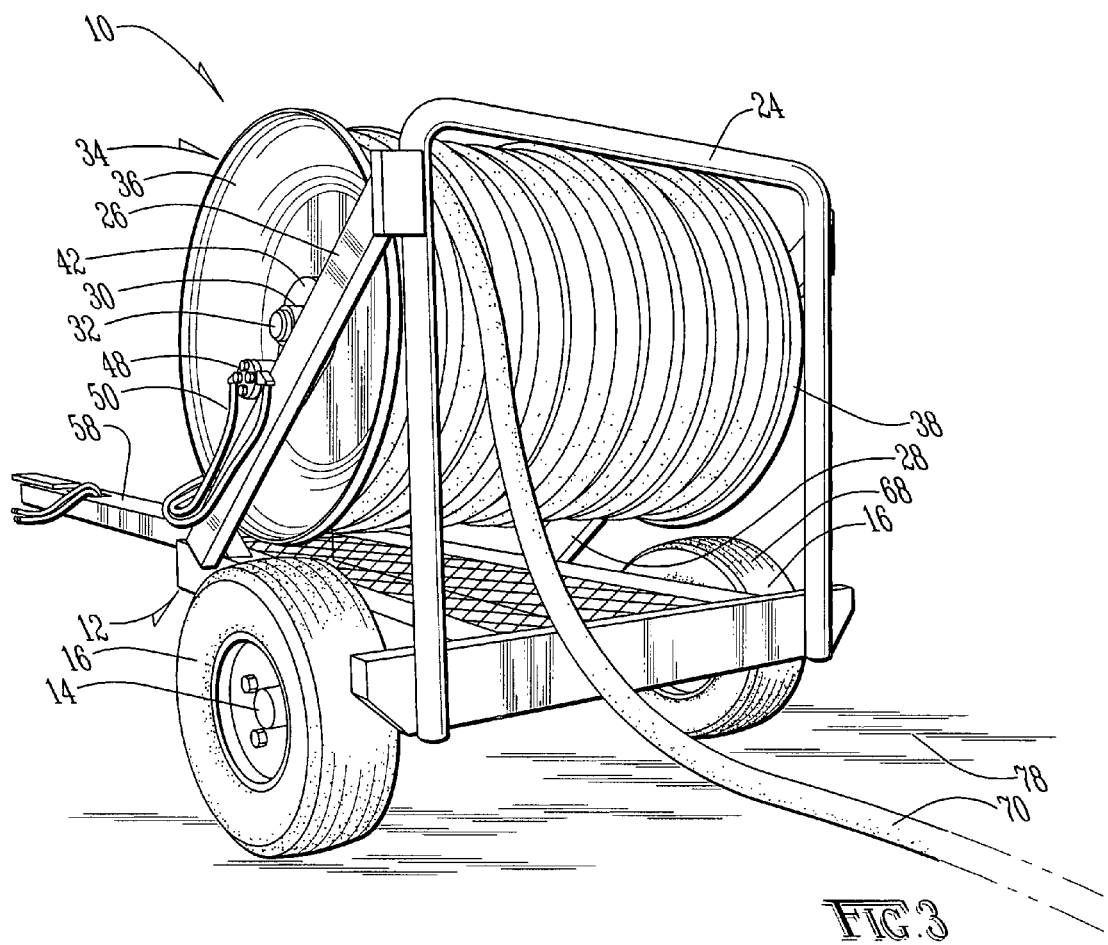
FIG. 3 illustrates a rear perspective view of the hose reel of the present invention laying hose onto an agricultural field.

When it is desired to operate the hose reel (10), the hose (70) is provided through a hole (76) in the sleeve (40) of the spool (34). The hydraulic motor (48) is then actuated to drive the small gear (46), chain (44) and large gear (42) to rotate the spool (34) to wind the hose (70) around the spool (34). (FIGS. 1 and 3). The size of the hydraulic motor (48), small gear (46), chain (44) and large gear (42) may be adjusted as desired to wind the hose (70) at the desired speed. When the hose (70) is being wound around the spool (34) while the hose reel (10) is stationary, it is desirable to feed the hose (70) back and forth across the spool (34) to insure an even winding around the spool (34).

Once the hose (70) has been provided around the spool (34), the hose reel (10) can be transported to a field (78) where it is desired to lay the hose (70) to supply a liquid manure distribution implement (not shown) from a liquid manure pump (not shown). The hose (70) is partially unwound from the spool (34) and secured in some manner, such as via connection to a liquid manure pump. The tractor (52) is then used to pull the hose reel (10) across an agricultural field (78). As the hose reel (10) is being pulled, the operator disengages the hydraulic motor (58) so the spool (34) feeds freely. If desired, the hydraulic motor (58) may be maintained in engagement to supply a slight resistance to the spool (34) to prevent the spool (34) from freewheeling and causing the hose (70) to tangle.

As the tractor (52) pulls the hose reel (10), the operator actuates the hydraulic piston (62) to cause the towing tongue (58) to pivot relative to the frame (12) of the hose reel (10). The operator preferably actuates the hydraulic piston (62) in alternate directions to cause the spool (34) to feed the hose (70) more evenly. The operator positions the side of the spool (34) currently feeding the hose (70) forward of the other side of the spool (34). This rotation allows the hose (70) to feed out more linearly behind the hose reel (10), reducing torque and kinking of the hose (70).

When it is desired to collect the hose (70), the end of the hose (70) is positioned through the hole (76) in the sleeve (40) of the spool (34), and the hydraulic motor (48) is actuated to rotate the spool (34). The tractor (52) and hose reel (10) are then driven over the hose (70) laying in the field (78). The operator actuates the hydraulic piston (62) back and forth to position the side of the spool (34), around which it is desired to be wound, more forward of the opposite end of the spool (34). The operator actuates the hydraulic piston (62) to pivot the spool (34) back and forth to evenly wind the hose (70) around the spool (34).

As shown in FIG. 1, the domes (36) and (38) of the spool (34) are preferably curved to facilitate an even winding of the hose (70) around the spool (34). The domes (36) and (38) may be provided with any desired curvature, or may directly tapered toward the sleeve (40) of the spool (34). Although the pivot box (56) may be located in any desired positioned, in the preferred embodiment, it is preferably that the pivot box (56) be located at the axle (32) to allow the pivot point of the hose reel (10) to be at the axle (14). It is also desirable to locate the sleeve (40) in alignment with the axle (14) to allow efficient winding of the hose (70) around the spool (34).

As shown in FIG. 4, the guide bar (24) is preferably sized to guide the hose (70) onto the spool (34). The guide bar (24) prevents the hose (70) from extending beyond either dome (36) or (38), or from back lashing by allowing excess hose (70) to extend over the spool (34) and cause a back lash and tangle.

The foregoing description and drawings merely explain and illustrate the invention, and the invention is not limited thereto, except insofar as the claims are so limited, as those skilled in the art who have the disclosure before them will be able to make modifications and variations therein without departing from the scope of the invention.

What is claimed is:

1. A hose reel system comprising:
   (a) a tongue;
   (b) a frame pivotably coupled to said tongue;
   (c) a spool journaled to said frame along a first axis;
   (d) an axle coupled to said frame along a second axis;
   (e) a wheel coupled to said axle; and
   (f) means for pivoting said frame relative to said tongue.

2. The hose reel system of claim 1, further comprising means for coupling said tongue to a power driven vehicle.

3. The hose reel system of claim 1, further comprising means for winding said spool.

4. The hose reel system of claim 3, wherein said winding means is hydraulic.

5. The hose reel system of claim 1, wherein said first axis and said second axis are on a single plane orthogonal to the ground.

6. The hose reel system of claim 1, wherein said spool contains a first end and a second end coupled to a center axle.

7. The hose reel system of claim 6, wherein said first end and said second end are bowed inward toward said center axle.

8. The hose reel system of claim 6, further comprising means for preventing a hose from winding outside an area between said first end and said second end.

9. The hose reel system of claim 8, wherein said preventing means is an arch guard.

10. The hose reel system of claim 1, wherein said axle is pivotably coupled to said tongue at a pivot point and wherein said turning means comprises means for pivoting said axle about said pivot point.

11. The hose reel system of claim 1, wherein said spool comprises a first dome and a second dome coupled to a center axle.

12. The hose reel system of claim 11, further comprising means provided substantially within said first dome for winding said spool.

13. A hose reel system comprising:
    (a) a carriage;
    (b) a wheel coupled to said carriage;
    (c) a tongue pivotably coupled to said carriage;
    (d) a spool coupled to said frame; and
    (e) means for moving said tongue relative to said carriage.

14. The hose reel system of claim 13, wherein said moving means is means for pivoting said tongue relative to said carriage.

15. The hose reel system of claim 13, further comprising means for coupling said tongue to a power driven vehicle.

16. The hose reel system of claim 13, wherein said spool comprises a first dome and a second dome coupled to a center axle.

17. The hose reel system of claim 16, further comprising means provided substantially within said first dome for winding said spool.

18. A hose reel system comprising:
   (a) a carriage;
   (b) a wheel coupled to said carriage;
   (c) a tongue pivotably coupled to said carriage; and
   (d) a spool coupled to said frame, said spool comprising:
      (i) a center axle;
      (ii) a first dome coupled to said center axle; and
      (iii) a second dome coupled to said center axle.

19. The hose reel system of claim 18, further comprising means provided substantially within said first dome for winding said spool.

20. The hose reel system of claim 18, further comprising:
   (a) first means for rotating said spool around a first axis coaxial with said center axle; and
   (b) second means for rotating said spool around a second axis wherein said second axis is not parallel with said first axis.

* * * * *